(12) United States Patent
Winger

(10) Patent No.: US 7,719,618 B2
(45) Date of Patent: *May 18, 2010

(54) METHOD AND APPARATUS FOR MASKING OF VIDEO ARTIFACTS AND/OR INSERTION OF FILM GRAIN IN A VIDEO DECODER

(75) Inventor: Lowell L. Winger, Waterloo (CA)

(73) Assignee: LSI Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/212,760

(22) Filed: Sep. 18, 2008

(65) Prior Publication Data

US 2009/0016444 A1 Jan. 15, 2009

Related U.S. Application Data

(63) Continuation of application No. 11/059,175, filed on Feb. 16, 2005, now Pat. No. 7,432,986.

(51) Int. Cl.
*H04N 5/50* (2006.01)
(52) U.S. Cl. ....................................... 348/625
(58) Field of Classification Search ................. 348/625, 348/606–609, 618, 620, 622–624; 375/240.29; 382/254, 275
See application file for complete search history.

(56) References Cited

U.S. PATENT DOCUMENTS

| 4,658,285 | A | * | 4/1987 | Lewis, Jr. | 348/621 |
|---|---|---|---|---|---|
| 5,641,596 | A | | 6/1997 | Gray et al. | 430/21 |
| 5,709,972 | A | * | 1/1998 | Cookingham et al. | 430/30 |
| 6,587,509 | B1 | * | 7/2003 | Suzuki et al. | 375/240.29 |
| 7,432,986 | B2 | * | 10/2008 | Winger | 348/625 |
| 2004/0196234 | A1 | | 10/2004 | Shiomi et al. | 345/89 |
| 2006/0023794 | A1 | | 2/2006 | Wan et al. | 375/240.29 |
| 2006/0088106 | A1 | * | 4/2006 | Winger | 375/240.24 |
| 2007/0047658 | A1 | * | 3/2007 | Tourapis et al. | 375/240.25 |
| 2007/0058866 | A1 | * | 3/2007 | Boyce et al. | 382/181 |
| 2007/0248280 | A1 | * | 10/2007 | Winger | 382/275 |

* cited by examiner

*Primary Examiner*—Paulos M Natnael
(74) *Attorney, Agent, or Firm*—Christopher P. Maiorana, PC

(57) ABSTRACT

A video decoder comprising a first comfort noise addition block and a second comfort noise addition block. The first comfort noise addition block may be configured to (i) add comfort noise to luminance data and (ii) adjust a distribution of the comfort noise added to the luminance data. The second comfort noise addition block may be configured to (i) add comfort noise to chrominance data and (ii) adjust a distribution of the comfort noise added to the chrominance data. The first and the second comfort noise addition blocks may be integrated into a video output path of the video decoder. The distribution of the comfort noise added to the luminance data and the distribution of the comfort noise added to the chrominance data may be adjusted independently.

20 Claims, 4 Drawing Sheets

METHOD AND APPARATUS FOR MASKING OF VIDEO ARTIFACTS AND/OR INSERTION OF FILM GRAIN IN A VIDEO DECODER

This is a continuation of U.S. Ser. No. 11/059,175, filed Feb. 16, 2005, now U.S. Pat. No. 7,432,986 which is incorporated by reference.

FIELD OF THE INVENTION

The present invention relates to compressed video generally and, more particularly, to a method and apparatus for masking of video artifacts and/or insertion of film grain in a video decoder.

BACKGROUND OF THE INVENTION

Numerous types of spatial and temporal artifacts are characteristic of transform compressed digital video (i.e., MPEG-2, MPEG-4, VC-1, WM9, DIVX, etc.). Artifacts can include contouring (particularly noticeable in smooth luminance or chrominance regions), blockiness, mosquito noise, motion compensation and prediction artifacts, temporal beating, etc.

Less structured (or "random" noise) is more characteristic of analog video, which is familiar to consumers through broadcast TV (cable or terrestrial), VHS/PAL video cassette playback, and film grain. In fact, film producers may desire the "look and feel" of particular film grain artifacts as a very noticeable artistic effect. Even when random noise is not desirable as an artistic effect, the random noise may be much less visually disturbing than a similar amount of the structured noise that is characteristic of digital video.

Random noise can visually mask (or hide) other video artifacts. Two common reasons to add some type of random noise to video for display are: 1) to mask digital encoding artifacts and 2) to display film grain as an artistic effect. Conventional solutions for adding noise to video use noise that is either pre-generated or generated on-the-fly. The problem with pre-generated noise is storage. For HD video rates, storage commonly uses expensive on-chip memories in order to meet the high video rates. In order to reduce storage requirements, the amount (or period) of the noise may be so short that visible structure is apparent.

Because of the cost of storage, on-the-fly generated noise is preferable. At HD video rates, on-the-fly generation of noise typically uses a low-cost, low-complexity method for generating the noise. A low complexity method that is known for generating pseudo-random noise is a linear-feedback-shift-register (LFSR).

Conventional solutions do not integrate the noise addition into the video output path of a compressed video decoder. However, the ideal point at which to add noise is after all filtering has been performed on the reconstructed video, but before the video values/ranges are adjusted. This cannot be accomplished without noise addition that is integrated into the video output path of the compressed video decoder.

It would be desirable to have a method and/or apparatus for masking of video artifacts and/or insertion of film grain in a video decoder.

SUMMARY OF THE INVENTION

The present invention concerns a video decoder comprising a first comfort noise addition block and a second comfort noise addition block. The first comfort noise addition block may be configured to (i) add comfort noise to luminance data and (ii) adjust a distribution of the comfort noise added to the luminance data. The second comfort noise addition block may be configured to (i) add comfort noise to chrominance data and (ii) adjust a distribution of the comfort noise added to the chrominance data. The first and the second comfort noise addition blocks may be integrated into a video output path of the video decoder. The distribution of the comfort noise added to the luminance data and the distribution of the comfort noise added to the chrominance data may be adjusted independently.

The objects, features and advantages of the present invention include providing a method and apparatus for masking of video artifacts and/or insertion of film grain in a video decoder that may (i) add noise before gamma-correction, (ii) add noise before brightness, contrast, saturation and/or hue adjustment, (iii) add noise after post-processing filtering (e.g., mosquito noise reduction, block noise reduction, noise reduction, coring), but before output from the video decoder, (iv) add noise after post-processing filtering and before gamma-correction and brightness/contrast/saturation/hue adjustment, (v) generate uniform video display noise, (vi) implement a linear feedback shift register (LFSR), (vii) generate video noise using a sum of two or more samples from an LFSR, (viii) approximate Triangle, Trapezoidal, and/or Gaussian noise, (ix) use an LFSR with a period that is at least one-quarter of a maximum field size of the video, (x) add separate samples to one or more color components (luma, chroma) and/or (xi) independently scale the luma and chroma noise.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
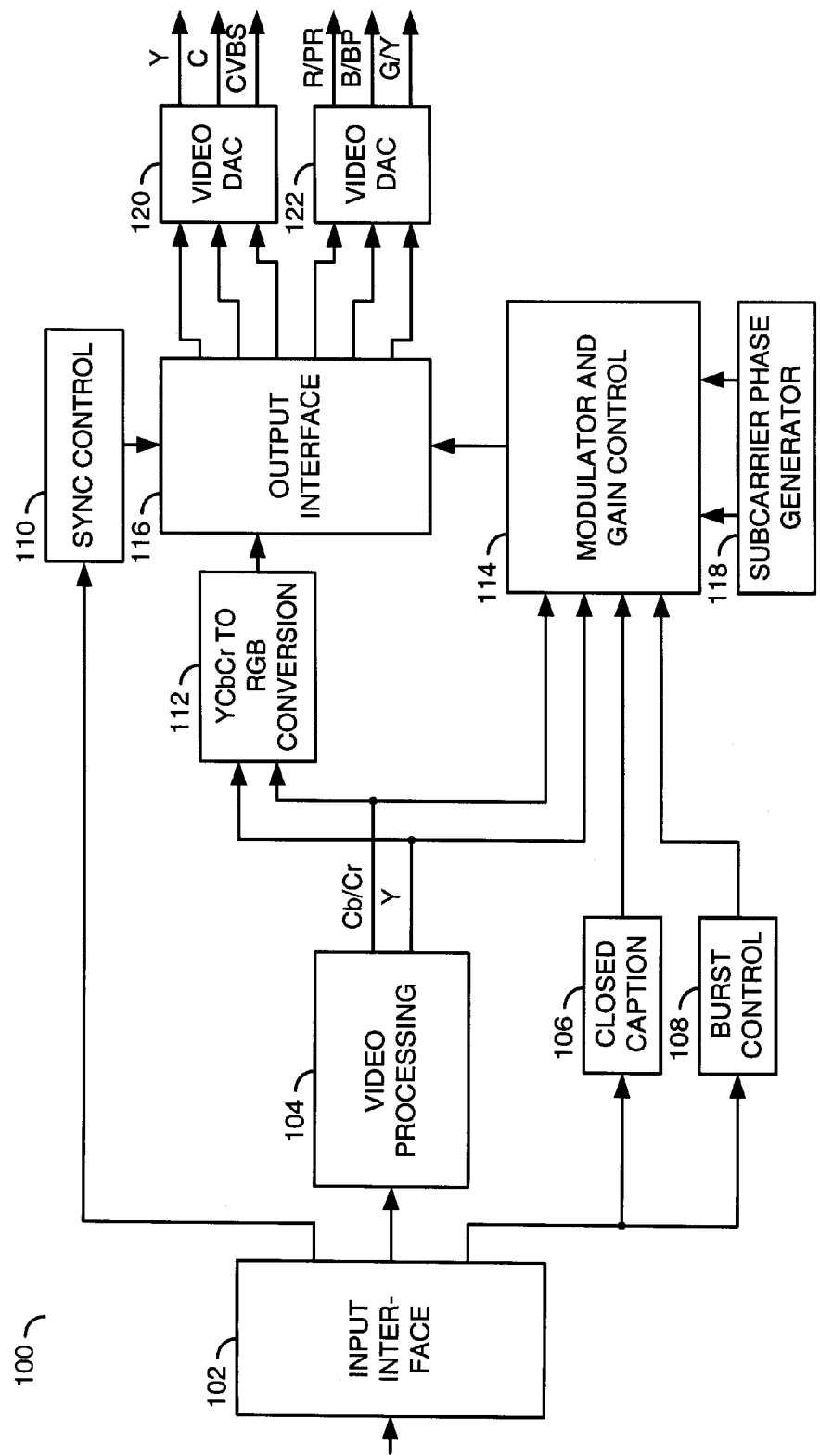
FIG. 1 is a block diagram of a digital video encoder in accordance with a preferred embodiment of the present invention.

Referring to FIG. 1, a block diagram of a circuit 100 is shown in accordance with one or more preferred embodiments of the present invention. The circuit 100 may be implemented as part of an output path of a video decoder (e.g., a DVD player, MPEG-2 decoder, etc.). The circuit 100 may be implemented, in one example, as a digital video encoder/converter circuit (or block). The circuit 100 may be configured to convert a digital video input data stream into a NTSC or PAL composite or component video output. In one example, a digital input format may include 8-bit (interleaved) or 16-bit YCbCr 4:2:2 video. The circuit 100 may be configured to demultiplex, scale and filter both luminance (also referred to as luma or Y) and chrominance (also referred to as chroma, Cb and Cr components, or U and V components) samples. The circuit 100 may be further configured, in one example, to upsample to 54 MHZ, where the color information may be modulated onto a sub-carrier. The circuit 100 may combine the luma and chroma signals with sync, pedestal and Macrovision pulses and convert the signals from digital to analog.

The circuit 100 may be configured to provide programmable features such as (i) blanking levels, (ii) color burst amplitudes, (iii) luminance and chrominance gains, (iv) sub-carrier frequency, and (v) luminance delay. The circuit 100 may provide for easy optimization of picture quality and sub-carrier genlock capability when used with a compatible video decoder to provide accurate color reproduction. The circuit 100 generally contains Close-Caption support and may support anti-taping signal generation in accordance with Macrovision. In one example, the circuit 100 may be configured to generate baseband composite (M) NTSC and (B, D, G, H, I) PAL video signals. The circuit 100 may also have separate Y/C outputs for supporting S-video. In one example, the circuit 100 may include a high definition (HD) data path that may be configured to support 720p (SMPTE 290M) and 1080i (SMPTE 274M) formats, where SMPTE represents the Society of Motion Picture and Television Engineers.

The circuit 100 may comprise a circuit (or block) 102, a circuit (or block) 104, a circuit (or block) 106, a circuit (or block) 108, a circuit (or block) 110, a circuit (or block) 112, a circuit (or block) 114, a circuit (or block) 118, a circuit (or block) 116, a circuit (or block) 120 and a circuit (or block) 122. The circuit 102 may be implemented, in one example, as an input interface circuit. The circuit 104 may be implemented, in one example, as a video processing circuit. The circuit 106 may be implemented, in one example, as a close-caption circuit. The circuit 108 may be implemented as a burst control circuit. The circuit 110 may be implemented as a synchronization (or sync) control circuit. The circuit 112 may be implemented as a YCbCr-to-RGB conversion circuit. The circuit 114 may be implemented as a modulator and gain control circuit. The circuit 116 may be implemented as an output interface circuit. The circuit 118 may be implemented as a sub-carrier phase generator. The circuits 120 and 122 may be implemented as video digital-to-analog converter (DAC) blocks.

Figure 2:
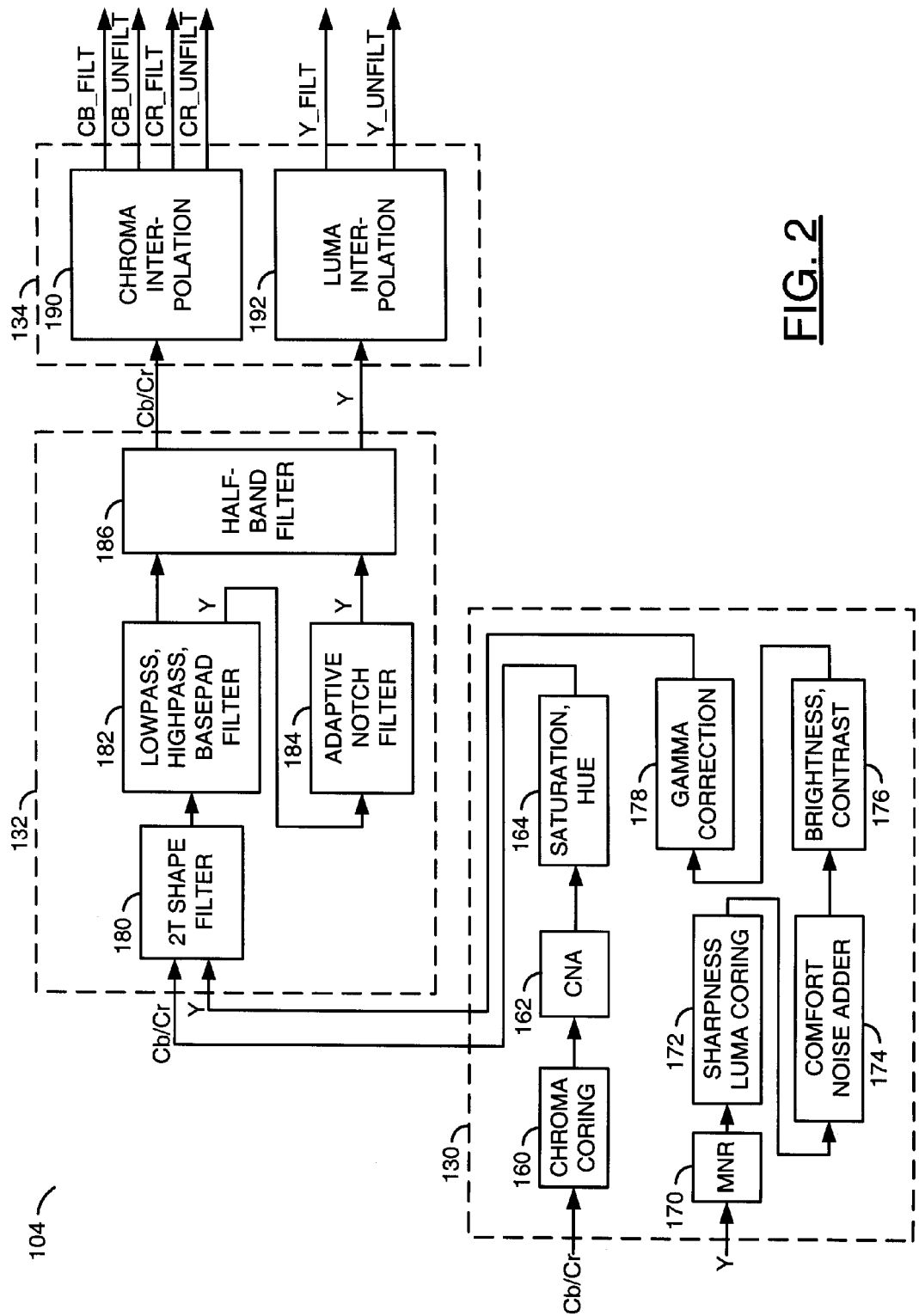
FIG. 2 is a more detailed block diagram of a video processing block of FIG. 1.

Referring to FIG. 2, a more detailed block diagram of the video processing block 104 of FIG. 1 is shown. In one example, the circuit 104 may comprise a circuit (or block) 130, a circuit (or block) 132 and a circuit (or block) 134. The circuit 130 may be implemented as a noise processing block. The circuit 132 may be implemented as a filter block. The circuit 134 may be implemented as an interpolation block.

The circuit 130 may have a first input that may receive luminance data (e.g., Y) and a second input that may receive chrominance data (e.g., chroma components Cb and Cr or U and V). The circuit 130 may have a first output that may present processed chrominance data to a first input of the circuit 132 and a second output that may present processed luminance data to a second input of the circuit 132. The circuit 132 may have a first output that may present filtered luminance data to a first input of the circuit 134 and a second output that may present filtered chrominance data to a second input of the circuit 134. The circuit 134 may have a number of outputs that may present filtered and unfiltered luminance and chrominance data.

The circuit 130 may comprise separate chrominance and luminance data paths. The chrominance data path of the circuit 130 may comprise a circuit (or block) 160, a circuit (or block) 162 and a circuit (or block) 164. The luminance data path of the circuit 130 may comprise a circuit (or block) 170, a circuit (or block) 172, a circuit (or block) 174, a circuit (or block) 176 and a circuit (or block) 178. The circuit 160 may be implemented, in one example, as a chroma coring circuit. The circuit 162 may be implemented as a comfort noise adder/generator (CNA/CNG) circuit. The circuit 164 may be implemented, in one example, as a saturation and hue adjustment circuit. The circuit 170 may be implemented as a mosquito noise reduction (MNR) circuit. The circuit 172 may be implemented, in one example, as a sharpness and luma coring circuit. The circuit 174 may be implemented as a comfort noise adder/generator (CNA/CNG) circuit. The circuit 176 may be implemented as a brightness and contrast adjustment circuit. The circuit 178 may be implemented as a gamma correction circuit.

The circuits 160, 170 and 172 may be implemented as part of a post-processing filter block. The post processing filter block may be configured to perform one or more of noise reduction, spatial filtering and temporal filtering (e.g., dynamic noise reduction, format upscaling, downscaling, coring, etc.). The circuits 160, 164, 170, 172, 176 and 178 may be implemented using conventional techniques.

In general, the circuits 162 and 174 are integrated in the output video data path at an ideal point at which to add noise. In one example, the circuit 162 and 174 may be implemented as a single comfort noise adder circuit. In a preferred embodiment of the present invention, noise is added after post-processing filtering operations (e.g., block noise reduction, mosquito noise reduction and coring) and before video value/range adjustment operations (e.g., brightness, contrast, saturation and hue adjustment and/or gamma correction). In general, the circuits 162 and 174 are placed prior to the circuits 164 and 176, respectively. However, the circuits 162 and 174 may also be placed after the circuits 164 and 176, respectively, and still provide advantages of the present invention.

In one example, the circuit 132 may comprise a circuit (or block) 180, a circuit (or block) 182, a circuit (or block) 184 and a circuit (or block) 186. The circuit 180 may be implemented as a 2T shaped filter. The circuit 182 may be implemented as a low pass, high pass baseband filter. The circuit 184 may be implemented as an adaptive notch filter. The circuit 186 may be implemented as a half-band filter. The circuit 134 may comprise a circuit (or block) 190 and a circuit (or block) 192. The circuit 190 may be implemented as a chroma interpolation block. The circuit 192 may be implemented, in one example, as a luma interpolation block. The circuits 132 and 134 may be implemented using conventional techniques.

Figure 3:
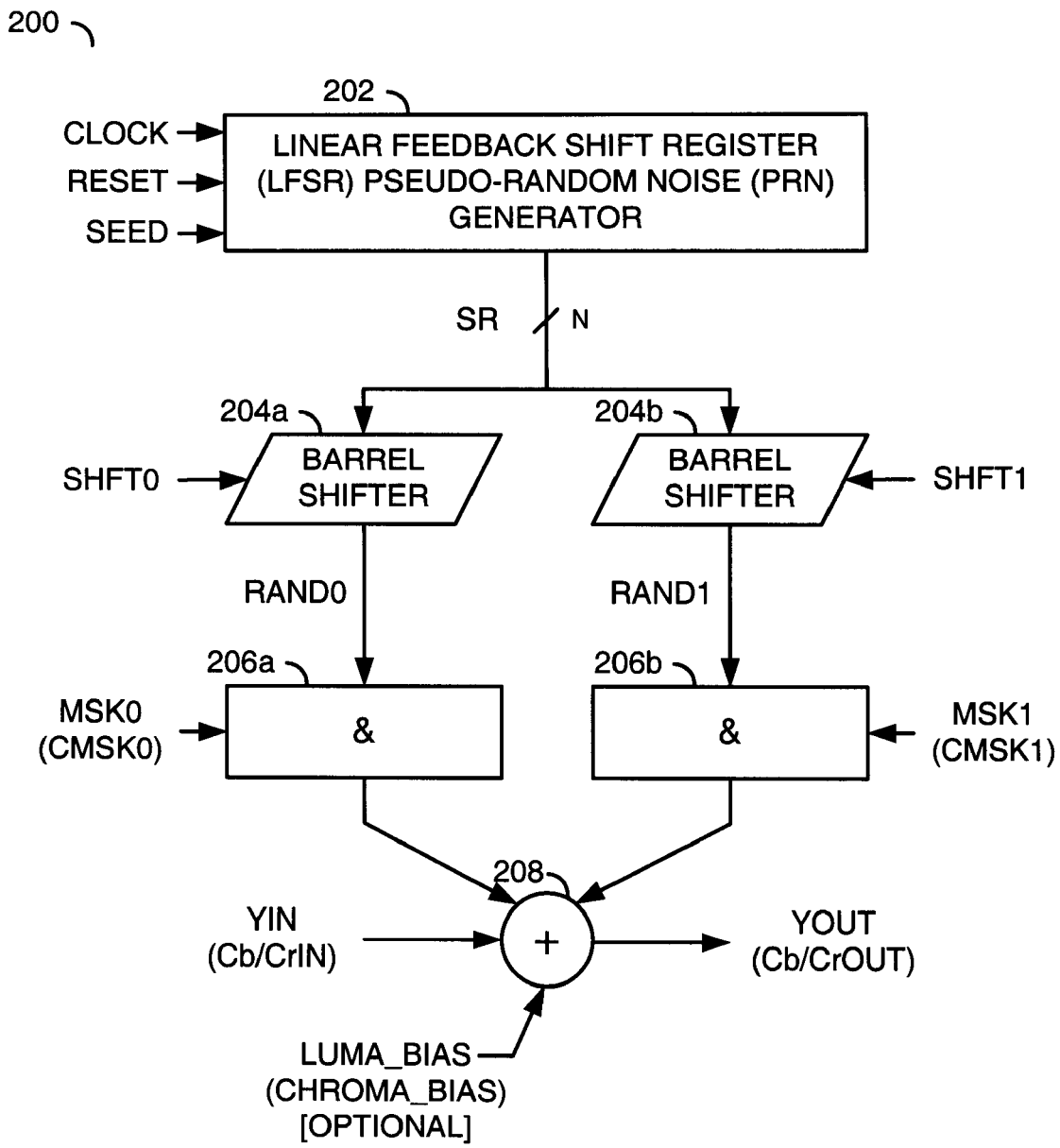
FIG. 3 is a more detailed block diagram illustrating a comfort noise adder block of FIG. 2 in accordance with a preferred embodiment of the present invention.

Referring to FIG. 3, a more detailed block diagram is shown illustrating an example comfort noise adder circuit 200. The circuits 162 and 174 of FIG. 2 may be implemented using one or more copies of the circuit 200. In one example, the comfort noise adder circuit 200 may comprise a circuit (or block) 202, a pair of circuits (or blocks) 204a-b, a pair of circuits (or blocks) 206a-b, and a circuit (or block) 208. The circuit 202 may be implemented as a linear feedback shift register (LFSR) pseudo-random noise (PRN) generator. The circuits 204a-b may be implemented as barrel shifters. The circuits 206a-b may be implemented as bit-wise AND circuits. The circuit 208 may be implemented as an adder circuit.

In one example, the circuit 202 may be implemented as a maximal period LFSR. In general, the circuit 202 may be implemented with 'N' 1-bit registers with 'M−1' XOR gates in the feedback path, where M equals the number of taps. "Tap" values for maximal period LFSRs (period=2^N−1) are well documented as would be recognized by those skilled in the art. In general, the number of XOR gates is 1 less than the number of 'taps' because there is always a bare (no XOR gate) feedback-wire (tap) between the last and first 1-bit registers. The circuit 202 may have a first input that may receive a signal (e.g., CLOCK), a second input that may receive a reset signal (e.g., RESET), a third input that may receive a control signal (e.g., SEED) and an output that may present a signal (e.g., SR). The signal SR may comprise an N-bit signal. The signal SEED may comprise a predetermined initial value for initializing of the circuit 200.

The signal SR may be presented to a first input of each of the circuits 204a and 204b. Each of the circuits 204a-b may have a second input that may receive a control signal (e.g., SHFT0 and SHFT1, respectively) and an output that may present a signal (e.g., RAND0 and RAND1, respectively). Each of the circuits 204a-b may be configured (i) to select a number of bits of the signal SR based on the respective signal SHFT0 or SHFT1 and (ii) to present the selected bits as the respective signals RAND0 and RAND1. The signals RAND0 and RAND1 may comprise pseudo-random numbers.

Each of the circuits 206a-b may have a first input that may receive a respective one of the signals RAND0 and RAND1, a second input that may receive a signal (e.g., MSK0 and MSK1, respectively) and an output that present a signal to an input of the circuit 208. The circuits 206a-b may be configured to perform bitwise AND operations between the signals RAND0 and MSK0 and between the signals RAND1 and MSK1, respectively.

The circuit 208 may have an input that may receive luma data (e.g., YIN) to which comfort noise is to be added and an output that may present a signal (e.g., YOUT). The circuit 208 generally adds the signals received from the circuits 206a-b to the signal YIN to generate the signal YOUT. In one example, the circuit 208 may be further configured to also add a bias value (e.g., LUMA_BIAS). A number of similar signals and/or similar circuits may be implemented accordingly to add comfort noise to the chroma data. For example, the circuits 206a-b and 208 may be duplicated and a number of chroma specific signals (e.g., CMSK0, CMSK1, Cb/CrIN, Cb/CrOUT and CHROMA_BIAS) implemented in the chroma data path. In one example, a single circuit 200 may be configured to add noise to the luma data and the chroma data. In another example, two or more of the circuit 200 may be implemented to independently add noise to the luma and chroma data or independently add noise to the luma data and each component (e.g., CB and Cr or U and V) of the chroma data.

In one example, the signal RAND0 may be implemented as 4-bits from the LFSR 202 with a uniform distribution and a range of [0,15]. The signal RAND1 may be implemented as 4-different-bits from the LFSR 200 with a uniform distribution and a range of [0,15]. The signals SHFT0 and SHFT1 may be configured to specify which bits from the LFSR are used for the signals RAND0 and RAND1, respectively. The signals MSK0 and MSK1 may be implemented as two arbitrary 4-bit user-programmable registers. The signals MSK0 and MSK1 may be configured to mask RAND0 and RAND1 when the signals are added to luma samples (e.g., the signals MSK0 and MSK1 may constrain the allowable values of the signals RAND0 and RAND1). The optional mask signals CMSK0 and CMSK1 may be implemented as two arbitrary 4-bit user-programmable registers to mask the signals RAND0 and RAND1 when the noise is added to chroma samples.

In one example, the values for the signals MSK0, MSK1, CMSK0 and CMSK1 may be selected from the group {0x0, 0x1, 0x3, 0x7, 0xf}, for k=0, 1, 2, 3, 4. The suggested values specify desirable values (e.g., that do not mask out the least significant bits (LSBs) of the noise) for MSK0 (k0) and MSK1 (k1) (or CMSK0 (k0) and CMSK1 (k1)). When the values for the signals MSK0 and MSK1 use the same value of 'k' (e.g., k0=k1) then the generated noise is truly a triangle distribution. when the signals have adjacent values of k (e.g., k0=k1+1 or k0=k1−1) then the noise is (isosceles) trapezoidal. The further apart the values of k0 and k1, the more uniform the noise becomes (e.g., the wider the flat top of the trapezoid 'top-cut-off-triangle' distribution). The values of MSK0, MSK1, CMSK0 and CMSK1 are generally determined based on desired scale, range and distribution of the comfort noise. Since separate signals are implemented for luma and chroma, the scale, range and distribution of luma comfort noise and chroma comfort noise may be independently adjusted.

In one example, software may be implemented to vary the comfort noise using the following example settings for the associated ranges: 1) [0,0] use k0=k1=0x0; 2) [−1,0] use k0=0x1, k1=0x0 (uniform); 3) [−1,1] use k0=k1=0x1 (triangle); 4) [−2,2] use k0=0x1, k1=0x3 (trapezoid); 5) [−3,3] use k0=k1=0x3 (triangle); 6) [−5,5] use k0=0x7, k1=0x3 (trapezoid); 7) [−7,7] use k0=k1=0x7 (triangle); 8) [−11,11] use k0=0xf, k1=0x7 (trapezoid); 9) [−15,15] use k0=k1=0xf (triangle). However, other settings may be implemented accordingly to meet the design criteria of a particular application. In one example, the settings may be selected such that a gradual temporal reduction/increase of noise level is possible (e.g., k0=0xf, k1=0xb for range [−13,13] and k0=0xf, k1=0x3 for range [−9,9]).

Figure 4:
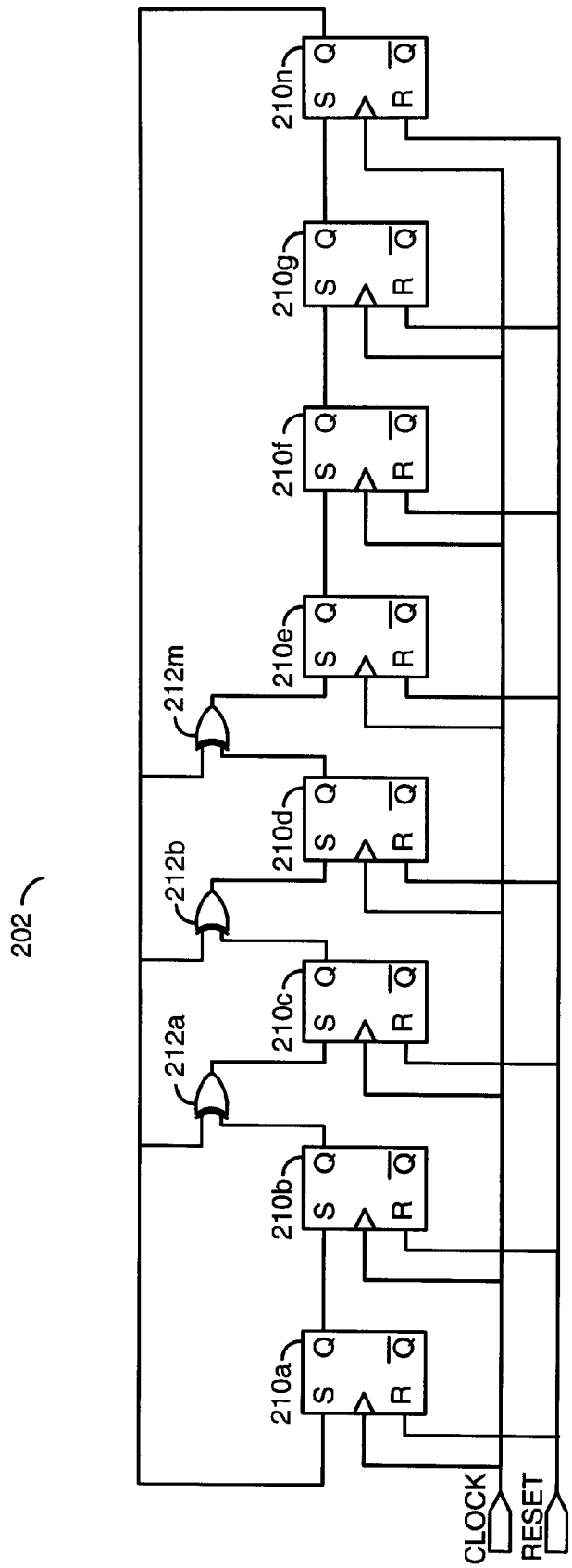
FIG. 4 is a block diagram illustrating an example linear feedback shift register.

Referring to FIG. 4, a block diagram is shown illustrating an example of a linear feedback shift register (LFSR). In one example, the linear feedback shift register 202 of FIG. 3 may be implemented with a number of SR flip-flops 210a-210n and a number of XOR gates 212a-212m. However, other types of flip-flops may be implemented accordingly to meet the design criteria of a particular application. The LFSR 202 may be described using (i) the number of registers and (ii) the positions of the XOR gates. For example, the LFSR illustrated in FIG. 4 may be described as an 8-bit LFSR with taps at [6, 5, 4]. In another example, the LFSR illustrated in FIG. 4 may be described with the number of bits included in the brackets (e.g., [8, 6, 5, 4]).

To prevent visible patterns in the masking noise the following properties are generally desired when choosing parameters for the LFSR 202: 1) a period that is a significant fraction of the largest supported frame size (e.g., 1920×1080) and 2) enough XOR-gates/taps to prevent correlation of random noise values. In a preferred embodiment, the period may be implemented with a value of at least 19-bits (¼ max frame). However, longer periods may be implemented to provide better perceptual quality.

In general, placing XOR-gates/taps between all bits that compose a random number, and XOR-gates/taps and delay-registers between random numbers that are combined to achieve a particular noise distribution results in the best noise visually. For example, for two 4-bit random numbers, 3-taps*2 numbers+1−taps*2 gaps=at least 8-XOR-gates may be implemented. In one example, a maximal sequence with the above properties may be implemented with nineteen 1-bit registers with XOR gates at taps [16, 15, 14, 12, 9, 7, 6, 5, 4]. Such an implementation has the minimum number of registers and only one extra XOR gate. In general, no lower complexity solution exists.

In one example, the LFSR bits may be modified for comfort noise generation. Triangle distribution noise looks more natural (closer to gaussian) than uniform noise. A triangle distribution may be achieved by adding two uniform random variables. The maximum desirable noise is generally [−15, 15] graylevels of noise in the output luma. An optional 1-bit software programmable register may be implemented to enable large range uniform noise [−128, 127] instead of triangle noise, with minimal overhead. For example, a control signal (e.g., TRIANGLEnotUNIFORM) may be implemented to select between the uniform noise distribution and the triangle (or trapezoid, or pseudo-gaussian) distribution. Although the range of triangle noise is generally sufficient for 'comfort noise' purposes (e.g., for which a nonintrusive noise level is desirable), the noise level for the H.264 Film Grain SEI message is generally not limited (e.g., the noise may potentially be full-range). The option selecting the noise distribution (along with the option for controlling the noise separately in the chroma) may provide better support for the H.264 Film Grain SEI message (with uniform rather than Gaussian noise, and without separately controllable noise in the two chroma bands).

Fully supporting the H.264 Film Grain SEI message may be prohibitively expensive. Reasonable improvements to better approximate exact support for the H.264 Film Grain SEI message may include: closer approximation to Gaussian noise (e.g., through either addition of more random variables or through direct transformation of the noise), exact variance scaling (e.g., with a programmable multiplier), autoregressive (AR) filtering to produce correlated noise, separate control of Cb and Cr band noise, range dependent control of variance and AR filtering (e.g., different noise parameters used for different original sample values), etc.

The functional elements of FIGS. 2-4 may be implemented in software (or firmware), hardware, or some combination of thereof. For example, one or more of the functional elements in the video encoder 100 may be implemented as stored program instructions executed by one or more microprocessors or other logic circuits. In one example, the circuit 100 may be part of an application specific integrated circuit (ASIC) or application specific standard product (ASSP). The operation of the comfort noise adder circuit 200 may be described with the following Pseudo-code:

```
TAPS = 0x0e978;      //(constant) specifies the locations of the
                       XOR gates
BITS = 19;           //(constant) specifies the fixed number of 1-bit
                       registers in the LFSR
SHFT[0]=4; SHFT[1]=13;  //(constants) bits 4..7 and bits 13..16
                          for the random numbers
SEED = 0x7ffff;      //(constant) initialization for shift
                       registers ( for an inverted LFSR value may be
                       0) All registers reset/init to '1'.
                       Alternatively, a somewhat more random SEED
                       may be implemented. In general, the LFSR is not
                       reset on each field/ frame. Ideally, the LFSR
                       is reset as infrequently as possible. Also,
                       the shift-register is clocked once only on
                       each active luma pixel.
MSK[0]     // (programmable) arbitrary 4-bits (default 0xf)
MSK[1]     // (programmable) arbitrary 4-bits (default 0xf)
SR  // (registers) 19-bit shift register
LFSR_function(input: SR, SEED=0x7ffff, BITS=19, TAPS=0xe978;
output: SR)
    SRlsb = SR&1; //get LSB of the shift-register.
    srtmp = (SR>>1)|(SRlsb<<(BITS−1)); //circular shift the
                                        shift-register
    SR = (SRlsb)?(srtmp & ~TAPS)|(~srtmp & TAPS):srtmp; //xor
LFSR-taps, LSB
```

For each luma sample:
1) call LFSR_function to update the shift-register SR;
2) add the noise to the current sample, then clip to the allowable sample range.

For example,

```
if (TRIANGLEnotUNIFORM==1) then    //triangle distribution
                                     noise (adds)
       luma_sample_value += ((SR >> SHFT0) &
MSK0) + ((SR>>SHFT1) & MSK1)) − ((MSK0+MSK1)>>1)
    else //TRIANGLEnotUNIFORM==0  //uniform distribution noise
       (concatenates)
       luma_sample_value += ((SR >> SHFT0) & MSK0) << 4 | ((SR >>
SHFT1) & MSK1)) − ((MSK0 << 4 | MSK1) >> 1)
```

(Optional) for Each Chroma Sample:
1) call LFSR_function to update the shift-register SR;
2) add the noise (certain bits of SR) to the current sample, then clip.

When the comfort noise adder 200 is implemented in hardware, the nineteen 1-bit registers (e.g., the flip-flops in a ring with nine connecting XOR gates), the eight AND gates (four each for MSK0 and MSK1), the two 8-bit (sample) to 8-bit (for uniform noise) adders (and perhaps two more adders for the biases that depend on the mask values to make the noise zero-mean) generally run at the pixel rate. Clipping may be implemented separately or already present depending on the stage of VIDEOIO where the noise is added. The hardware may be clocked on either every sample, or only on luma samples. Optionally, eight extra AND gates (four for each CMSK0 and CMSK1) may be implemented along with various registers, muxes, etc, to meet the design criteria of a particular implementation.

The LFSR 202 may be mapped to a control bus space and may be optionally initialized by software during vertical blanking. In one example, the LFSR 202 may be initialized with all '1's. A single linear shift and feedback operation may be performed before every time the content of the LFSR is used to generate a noise value. In general, the initial value (e.g., 0x7ffff) is not used as the first noise value. One linear shift and feedback operation may be carried out for luma. Another operation may be carried out for chroma (e.g., the same noise value may be applied to both Cb and Cr), if chroma noise is activated. When running the LFSR 202 twice as fast in order to time share between the luma and chroma data path is difficult, two copies of the LFSR 202 may be implemented. However, the chroma is generally one shift ahead of the luma and both copies of the LFSR 202 are generally configured to compute a two-shift value for every operation.

The chroma noise addition may be optional and only activated based on a chroma mask (e.g., CMSK0 or CMSK1). In one example, chroma noise may be activated when either of the masks CMSK0 or CMSK1 are non-zero. When chroma noise is not activated, the LFSR noise value generated from every shift and feedback may be used for the luma noise. For example, every other noise value for the chroma may also be used for the luma.

The random noise may be added to luma by the following procedure:
1. Perform one shift and feedback operation on the last SR value.
2. Select two 4-bit sub-regions of the SR based on a value of a first and second variable (e.g., SHFT0 and SHFT1). For example, if SHFT0=4, select SR[7:4] and if SHFT1=13, select SR[16:13].
3. Add the noise values to the luma value and clamp the result to the same number of bits as the original pixels:

```
if (TRIANGLEnotUNIFROM == 1) {
    luma_sample_value += [((SR >> SHFT0) & MSK0)
        + ((SR >> SHFT1) & MSK1)]
        - luma_bias
else
    luma_sample_value += [((SR >> SHFT0) & MSK0) << 4
        | ((SR >> SHFT1) & MSK1)]
        - luma_bias
}
```

In general, all addition operations are implemented with sufficient width so that an intermediate result does not become a "modulo add" and the final result may be clamped back to the original input data width.

In one example, luma_bias and chroma_bias may be implemented as 7-bit positive integer numbers. In a preferred embodiment, the values may be determined as follows:

```
if (TRIANGLEnotUNIFROM ==1) {
    luma_bias = (( MSK0 + MSK1 ) >> 1)
    chroma_bias = (( CMSK0 + CMSK1 ) >> 1)
else
    luma_bias = (( MSK0 << 4 | MSK1 ) >> 1)
    chroma_bias = (( CMSK0 << 4 | CMSK1 ) >> 1)
``` where, MSK0, MSK1, CMSK0 and CMSK1 represent 4-bit registers and are not changed during active video region. A control field (e.g., TRIANGLEnotUNIFORM) may be normally set to '1' and is generally not changed during active video region.

In general, chroma noise addition is not activated without luma noise addition. The noise addition is generally only activated when one or both of the signals MSK0 and MSK1 are non zero. The comfort noise modules 162 and 174 may be bypassed when noise addition is not activated. SHFT0 and SHFT1 may be implemented as 4-bit fields and may allow selection of any 4-bit region of the 19-bit signal SR.

Comfort noise addition/generation (CNA/CNG) generally helps to hide coding artifacts (contouring, blockiness, etc.) and lends a natural looking texture to video that prevents a 'plastic' appearance. In one example, a hardware implementation in accordance with the present invention may provide a noise appearance that is superior to a noise appearance provided by a software only CNA/CNG. Especially when the software only CNA/CNG is limited by the use only a very small length noise sequence. The hardware implementation in accordance with the present invention may be implemented with very minimal hardware and may run at HD sample rates in VIDOUT. While adding the noise to luma only is generally sufficient, also enabling the addition of noise to chroma generally provides hardware support for addition of 'Film Grain' to support the H.264 version 3 Film Grain SEI message.

The present invention may provide automatic scaling of masking noise with video artifacts without a reduction in masking capability. By adding noise after post-processing and before value/range adjustment, 1) the masking noise is not processed by the post-processing (e.g., certain frequencies of noise are not removed, the noise is not visibly blurred, etc.) so that the noise is not made to appear unnaturally suppressed in certain spatial locations or frequency bands and 2) the range/value adjustment operates on the masking noise and the artifacts equally. Since the masking noise and the artifacts are operated upon equally, if certain luminance or chrominance ranges are enhanced such that artifacts in these ranges are more visible, the noise in those ranges is similarly made more visible such that the relative masking effect is not reduced.

The present invention generally adds the comfort noise before video level adjustments (e.g., gamma correction, brightness adjustment, contrast adjustment, saturation adjustment and hue adjustment) are performed. By integrating the noise addition into the decoder before the video level adjustments, the compression artifacts and masking noise are both added into the video when the masking noise is in a reasonably perceptually uniform state such that the masking noise may be appropriately adjusted to match the compression noise by simple brightness/chrominance independent scaling. Adding the noise after gamma correction generally makes the masking ability of the noise dependent upon the brightness of the video source (e.g., the noise would be much less perceptually uniform).

In one example, the comfort noise addition circuit may be configured to avoid initialization to the same initial state on every field and/or frame and/or line and/or segment (number of lines) that is a multiple of a predetermined number of fields (e.g., every field, a group of pictures (GOP), fields in a second of video, etc.) to avoid producing a noise pattern that may become disturbing. In general, the less frequent the initialization, the less perceptible the noise addition. As used herein, the same initial state generally refers to getting the same random noise sample output, independent of the scaling of the sample, but dependent on the distribution of the noise. For example, when the same LFSR seed is used, but the noise distribution is reset from uniform to triangular, the noise addition circuit is considered to not have the same initial state. When the same LFSR seed and the same noise distribution are selected, the noise addition circuit is considered to have the same initial state even if the scaling is changed.

The present invention may be used not only for adding noise to mask video artifacts, but also to approximate the reproduction of Film Grain Noise according to the H.264 Film Grain SEI message. The H.264 Film Grain SEI message generally specifies the characteristics of the film grain noise (e.g., variance for luminance and chrominance). The addition of film grain to decoded video as a display process after the video is decoded is being seriously considered for HD-DVD content. The advantages are that the quality of the compressed video may be improved by pre-removing the film grain from the content. However, the artistic appearance of the video is generally not substantially altered as long as the film grain noise is added back in at the decoder.

In one example, comfort noise may be added to the luma, while chroma is not changed. Two types of noise distribution function may be implemented, a trapezoid noise distribution function (e.g., a triangle function is a specific case of trapezoid) and a uniform noise distribution function. However, other types of noise distribution functions (e.g., pseudo-gaussian) may also be implemented.

The present invention may also provide a significant improvement to the chroma. If the two chroma components (e.g., Cb and Cr or U and V) add exactly the same (0-mean) random noise value from the LFSR to the same sample, then the chroma noise may appear to noticeably tinge the chroma towards (1) purple and green. If the sign of a single noise value is reversed before adding to one of the components (and not reversed for the other component), then the noise tinges the chroma towards (2) red and blue. In general, either of the options is just as poor visually as only adding noise to either Cb or Cr, but not both. For example, when noise is added to either Cb or Cr, the noise bias is either only (3) blue/yellow or only (4) green/red, respectively. However, mixing any two of the above four options together generally produces natural appearing chroma noise (e.g., essentially as good as having independent noise samples for Cb and Cr).

Various mixing options that have a much better chroma appearance may be implemented. The preferred options generally alternate two of the above four chroma noise addition options between alternating samples, either horizontally or vertically or both. In a preferred embodiment, the process may alternate two of the above four chroma noise addition options between alternating samples in a checkerboard pattern. However, such an option may be complicated to implement. A simpler solution may be implemented to add the masking noise only to one of the components Cb or Cr at a time, alternating on a sample by sample basis. For example, if Cb for a sample has noise added, then rather than adding the same value to Cr, Cr is left alone.

The present invention may provide a solution that uses fewer independent noise samples for the chroma data while achieving as broad a coverage as possible of the colorspace. For example, the present invention may use a single independent noise sample per pair of chroma samples (e.g., Cb and Cr or U and V) corresponding to a single spatial sample and change the method in which the sample is used from pixel to pixel. In one example, the sample may be added to only the Cb or U component for half of the pixels and to the Cr or V component in the alternate pixels. In another example, a regular pattern of (i) adding the sample to Cb only, (ii) adding the sample to Cr only, (iii) adding the sample to both Cb and Cr, (iv) subtracting the sample from one component and adding the sample to the other component, etc. may provide valid alternatives that use only one independent sample per chroma pair while covering the colorspace. In one example, complete coverage of the colorspace may be achieved by using a random weighting of the independent sample on the Cb(U) and Cr(V) samples.

While the invention has been particularly shown and described with reference to the preferred embodiments thereof, it will be understood by those skilled in the art that various changes in form and details may be made without departing from the spirit and scope of the invention.

The invention claimed is:

1. A video decoder comprising:
a first comfort noise addition block configured to (i) add comfort noise to luminance data and (ii) adjust a distribution of said comfort noise added to said luminance data; and
a second comfort noise addition block configured to (i) add comfort noise to chrominance data and (ii) adjust a distribution of said comfort noise added to said chrominance data, wherein (a) said first and said second comfort noise addition blocks are integrated into a video output path of said video decoder and (b) said distribution of said comfort noise added to said luminance data and said distribution of said comfort noise added to said chrominance data are adjusted independently.

2. The video decoder according to claim 1, further comprising a post-processing filter block configured to perform one or more of noise reduction, spatial filtering, temporal filtering, mosquito noise reduction (MNR), dynamic noise reduction, coring, format upscaling, format downscaling, and sharpness adjustment.

3. The video decoder according to claim 1, further comprising a video value/range adjustment block configured to adjust one or both of a value and a range of said luminance data and said chrominance data.

4. The video decoder according to claim 3, wherein said video value/range adjustment block is further configured (i) to adjust brightness and contrast of said luminance data and (ii) to adjust saturation and hue of said chrominance data.

5. The video decoder according to claim 4, wherein said video value/range adjustment block is further configured to adjust said brightness, contrast, saturation and hue after said comfort noise is added to one or both of said luminance data and said chrominance data.

6. The video decoder according to claim 1, wherein said video decoder is configured to adjust (i) brightness and contrast of said luminance data and (ii) saturation and hue of said chrominance data prior to adding comfort noise to said luminance data and said chrominance data.

7. The video decoder according to claim 1, wherein said first and said second comfort noise addition blocks are either (i) coupled after a post-processing filter block in said video output path, (ii) coupled before a video value/range adjustment block in said video output path or (iii) coupled after said post-processing filter block and before said video value/range adjustment block in said video output path.

8. The video decoder according to claim 1, wherein said first and said second comfort noise addition blocks are further configured to adjust independently (i) one or both of a scale and a range of said comfort noise added to said luminance data and (ii) one or both of a scale and a range of said comfort noise added to said chrominance data.

9. The video decoder according to claim 1, wherein (i) said distribution of said comfort noise added to said luminance data and (ii) said distribution of said comfort noise added to said chrominance data are selected from the group consisting of uniform, triangle, trapezoidal and pseudo-gaussian.

10. The video decoder according to claim 1, wherein said second comfort noise addition block is further configured to use a single independent noise sample for each chrominance component pair corresponding to a single spatial sample of said chrominance data, wherein how said single independent noise sample is used varies from pixel to pixel.

11. The video decoder according to claim 10, wherein said single independent noise sample is added alternately to either (i) a first component or (ii) a second component of each chrominance component pair corresponding to a single spatial sample of said chrominance data.

12. The video decoder according to claim 1, wherein said first and said second comfort noise addition blocks are configured to add separate noise samples to said luminance data and said chrominance data.

13. The video decoder according to claim 1, wherein said first and said second comfort noise addition blocks comprise a linear feedback shift register (LFSR) configured to generate uniform video display noise.

14. The video decoder according to claim 13, wherein said LFSR is configured to have a period of at least one-quarter of a maximum field size of said video decoder.

15. A video decoder comprising:
means for generating comfort noise;
means for adjusting one or more of a scale and a range of said comfort noise, wherein (i) comfort noise added to said chrominance data and (ii) comfort noise added to said luminance data are adjusted independently;
means for adjusting a distribution of said comfort noise, wherein (i) a distribution of said comfort noise added to said chrominance data and (ii) a distribution of said comfort noise added to said luminance data are adjusted independently; and
means for adjusting one or more of a value and a range of said luminance data and said chrominance data, wherein said comfort noise generating means is integrated in a video output path of said video decoder.

16. A method of adding video noise in a video decoder comprising the steps of:
generating comfort noise;
adjusting one or more of a scale and a range of said comfort noise, wherein (i) comfort noise added to said chrominance data and (ii) comfort noise added to said luminance data are adjusted independently; and
adjusting a distribution of said comfort noise, wherein (i) a distribution of said comfort noise added to said chrominance data and (ii) a distribution of said comfort noise added to said luminance data are adjusted independently, wherein said comfort noise is added to one or both of said luminance data and said chrominance data in a video output path of said video decoder.

17. The method according to claim 16, further comprising:
adjusting one or more of a value and a range of one or both of said luminance data and said chrominance data.

18. The method according to claim 17, wherein said comfort noise is either (i) added after post-processing filtering is performed in said video output path, (ii) added before adjusting one or more of said value and said range of said luminance data and said chrominance data, or (iii) added after said post-processing filtering is performed and before said value and said range of said luminance data and said chrominance data are adjusted in said video output path.

19. The method according to claim 18, wherein:
said post-processing filtering comprises one or more of dynamic noise reduction, coring, format upscaling, and format downscaling; and
the step of adjusting one or more of a value and a range of said luminance data and said chrominance data comprises adjusting brightness and contrast of said luminance data and adjusting saturation and hue of said chrominance data.

20. The method according to claim 16, further comprising the step of:
using a single independent noise sample for each chrominance component pair corresponding to a single spatial sample of said chrominance data, wherein application of said single independent noise sample varies from pixel to pixel.

* * * * *